US 11,644,290 B2
May 9, 2023

(12) United States Patent
Hemeyer et al.

(10) Patent No.: US 11,644,290 B2
(45) Date of Patent: *May 9, 2023

(54) DUAL-BARREL POWDER DISPENSER

(71) Applicant: Bushnell Inc., Overland Park, KS (US)

(72) Inventors: William Clark Hemeyer, Overland Park, KS (US); Joe Dunning, Gridley, CA (US)

(73) Assignee: Bushnell Inc., Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 17/564,161

(22) Filed: Dec. 28, 2021

(65) Prior Publication Data
US 2022/0120545 A1 Apr. 21, 2022

Related U.S. Application Data

(63) Continuation of application No. 17/195,976, filed on Mar. 9, 2021, now Pat. No. 11,236,981, which is a continuation of application No. 16/505,217, filed on Jul. 8, 2019, now Pat. No. 10,982,938.

(60) Provisional application No. 62/695,709, filed on Jul. 9, 2018.

(51) Int. Cl.
F42B 33/02 (2006.01)
(52) U.S. Cl.
CPC .................. F42B 33/0285 (2013.01)
(58) Field of Classification Search
CPC .................. F24B 33/0207; F24B 33/0285
USPC ....... 141/83; 86/31; 222/138, 167, 219, 247, 222/339, 520, 566; 177/123, 246
See application file for complete search history.

(56) References Cited

U.S. PATENT DOCUMENTS

| 4,696,356 A | 9/1987 | Ellion et al. |
| 5,005,657 A | 4/1991 | Ellion et al. |
| 5,040,449 A | 8/1991 | Lee |
| (Continued) | | |

FOREIGN PATENT DOCUMENTS

| FR | 1017668 A | 12/1952 |
| GB | 1459394 A | 12/1976 |

OTHER PUBLICATIONS

Hornady, Lock-N-Load Auto Charge, Dec. 2014, Owner's Manual, Item No. 050068, pp. 1-8 (Year: 2014).

(Continued)

*Primary Examiner* — Timothy L Maust
(74) *Attorney, Agent, or Firm* — Walter M. Egbert, III; Richard J. Brown; Reed Smith LLP

(57) ABSTRACT

A powder dispensing device is provided including a housing; a hopper sized and shaped to engage the housing to form a reservoir; a first barrel in fluid communication with the reservoir via one or more first apertures and having a first internal diameter; a second barrel in fluid communication with the reservoir via one or more second apertures and having a second internal diameter, wherein the first internal diameter is greater than the second internal diameter; at least one motor coupled to the first barrel and the second barrel, the at least one motor configured to rotate the first barrel and the second barrel; a scale electrically coupled to a scale plate, the scale plate disposed on the housing and below the first barrel and the second barrel; and a user interface in electrical communication with the at least one motor and the scale, the user interface configured to receive a user-input.

19 Claims, 10 Drawing Sheets

(56) References Cited

U.S. PATENT DOCUMENTS

| | | | |
|---|---|---|---|
| 6,121,556 | A | 9/2000 | Cole |
| 8,047,408 | B2 | 11/2011 | Eaton et al. |
| 9,829,295 | B2 | 11/2017 | Todd |
| 10,563,966 | B2 | 2/2020 | Haberman |
| 10,982,938 | B2 * | 4/2021 | Hemeyer ............ F42B 33/0285 |
| 10,982,939 | B2 * | 4/2021 | Hemeyer ............ F42B 33/0285 |
| 2007/0084520 | A1 | 4/2007 | Driessen et al. |
| 2010/0314419 | A1 | 12/2010 | Real et al. |
| 2020/0011644 | A1 | 1/2020 | Hemeyer et al. |
| 2020/0033105 | A1 | 1/2020 | Hemeyer et al. |
| 2020/0064114 | A1 | 2/2020 | Kinney et al. |

OTHER PUBLICATIONS

International Search Report and Written Opinion cited in International Application No. PCT/US19/40834 dated Sep. 26, 2019.
Examination Report in related Australian Patent Application No. 2019300848, dated Aug. 23, 2021.
The First Office Action in related Chinese Patent Application No. 201980051218.0, dated Jan. 6, 2022.
The First Examination Report in related New Zealand Patent Application No. 771736, dated Jan. 6, 2022.
European Search Report Report in related European Patent Application No. 19833396.5, dated Mar. 2, 2022.
RCBS Chargemaster Lite: (YouTube Video) [retrieved from the internet Feb. 12, 2021] <URL:https//www.youtube.com/watch?v=MewrvkLv4dU>.

* cited by examiner

DUAL-BARREL POWDER DISPENSER

CROSS-REFERENCE TO RELATED APPLICATIONS

The present disclosure is a continuation of U.S. patent application Ser. No. 17/195,976, filed Mar. 9, 2021, which is a continuation of U.S. patent application Ser. No. 16/505,217, filed Jul. 8, 2019, now U.S. Pat. No. 10,982,938, issued Apr. 20, 2021, which claims priority to U.S. Provisional Patent Application No. 62/695,709, filed on Jul. 9, 2018, the content of which are hereby incorporated by reference in their entirety.

FIELD OF INVENTION

The present disclosure relates to a powder dispenser for ammunition loading, and more particularly to a device for a dual-barrel dispensing system with increased accuracy and speed.

BACKGROUND

Experienced hunters may calibrate their firearm or sighting device for a particular trajectory pattern specific to a given weight. Mass-produced and packaged ammunition, however, can have inconsistent and varying weights for each bullet, even within the same production run and package. As a result, the varying weights typical to commercially produced ammunition can result in inconsistent and inaccurate shooting. These variances may be small and therefore undetectable even by an enthusiast in the field without additional equipment and analysis. Powder dispensers allow outdoor enthusiasts, such as hunters and marksmen, to weigh, fill and case their own ammunition. Each individual casing is typically weighed and measured to load the ammunition with a desired weight.

Highly accurate scales may be used to measure an exact powder weight for a casing. The fine granularity of the powder, however, still makes measuring and dispensing the exact weight within a tolerable range difficult. Traditional powder dispensers may use scales, volumes, and other measuring devices to dispense powder quickly, at the cost of accuracy. Other devices may be tuned to slowly dispense a powder for a more accurate volume, however, at the cost of expediency. Previous solutions requires the use of separate and independent devices, which required an enthusiast user to operate the two dispensers independently in series to load a single cartridge. Such ad-hoc systems, however, are time consuming, costly, and cumbersome.

SUMMARY

According to one aspect, and described herein, a dual-barrel powder dispenser offers a highly-accurate, and highly efficient system and method for dispensing a consistent amount of powder. A controller in communication with the interface may determine the speeds at which each barrel rotates in order to dispense a volume and weight of powder from a hopper to a receptacle. A scale may monitor and determine the total weight of powder dispensed into the receptacle resting on the scale. The entire assembly may be self-contained in a single integrated body.

According to one aspect, the present disclosure provides a powder dispensing device including a housing and a hopper sized and shaped to engage the housing to form a reservoir. A first barrel and a second barrel may be in fluid communication with the reservoir. At least one motor may be coupled to the first barrel and the second barrel. The at least one motor may be configured to rotate the first barrel and the second barrel. A scale may be electrically coupled to a scale plate. The scale plate may be disposed on the housing and below the first barrel and second barrel. A user interface may be in electrical communication with the at least one motor and the scale. The user interface may be configured to receive a user-input.

According to another aspect, a powder dispenser may include a housing and a hopper sized and shaped to engage the housing to form a reservoir. A first barrel and a second barrel may be in fluid communication with the reservoir. At least one motor may be coupled to the first barrel and the second barrel. The at least one motor may be configured to rotate the first barrel and the second barrel. A scale electrically may be coupled to a scale plate. The scale plate may be disposed on the housing and below the first barrel and second barrel. A user interface may be in electrical communication with the at least one motor and the scale. The user interface may be configured to receive a user-input. A processor may be configured to operate the at least one motor according to a first the user input and receive a measurement from the scale. The processor may drive the first barrel at a first rotational speed and drive the second barrel at a second speed according to the measurement from the scale.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Aspects of the present disclosure provide a system and method for accurately and efficiently dispensing powder for loading ammunition. A dual-barrel dispensing mechanism provides a user-friendly, convenient and efficient system and method for dispensing a highly-accurate and dependable amount of powder, or charge, to fill a projectile casing. Aspects of an exemplary device are depicted in FIGS. 1-8 and described herein.

Figure 1:
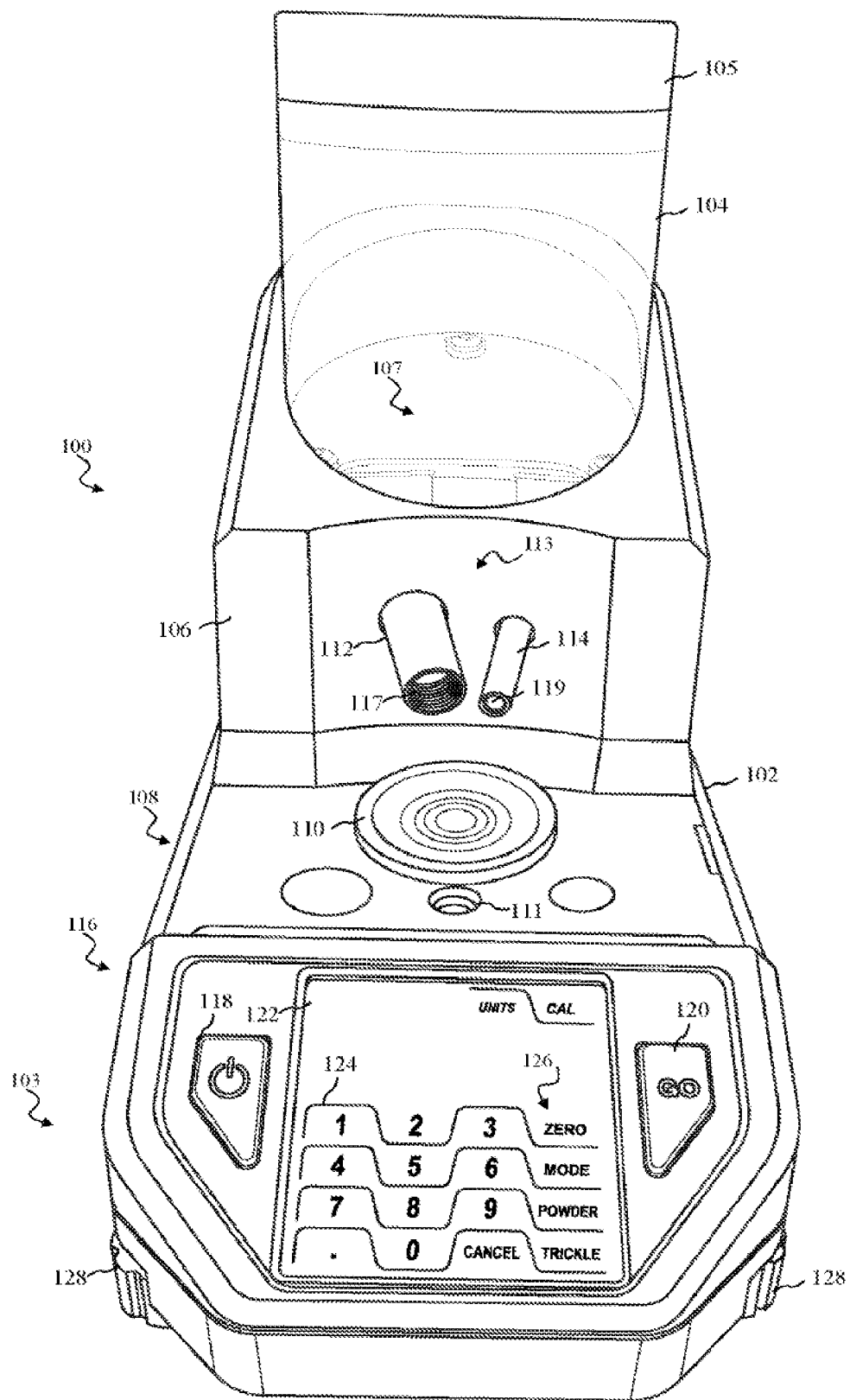
FIG. 1 depicts a front view of a powder dispenser device according to one aspect of the present disclosure.

FIG. 1 depicts a front view of a powder dispenser device 100 according to one aspect of the present disclosure. The device 100 may include a housing 102, a hopper 104 for powder storage, a cover 105, a user interface 116, and a dual-barrel arrangement 113 for dispensing a weight of powder to a pan or dish (not shown) contemporaneously weighed on a high-accuracy scale plate 110. A digital user-interface 116 may be used to program the device 100, initiate a dispensing operation, and display the current scale measurements and settings to the user.

The housing 102 may include a first portion 103 that includes the user interface 116, and one or more leveling legs 128. The user interface 116 may include a power button 118, a "Go" button 120 and a display 122. The power button 118 may activate the internal electronics and mechanics described herein via a power supply, internal or external. The "Go" button 120 may be configured to initiate a dispensing operation according to the parameters and settings input by a user or stored in a memory. The display 122 may include a keypad 124, one or more function buttons 126, as well as a visual output indicating the details associated with a dispensing operation. The display 122 may be an LCD, LED, OLED, or the like. The keypad 124, the power button 118, the "Go" button 120, function buttons and others may include physical buttons electrically coupled to the circuitry, or may include touch sensitive indicators on the display 122. The visual output may include, without limitation, current device settings, current weight measured on the scale plate 110, or other indicators in connection with the dispensing and weighing of powder. Leveling legs 128 may be coupled to the housing via a threaded screwing arrangement, or the like, that allow the leveling legs 128 to move up and down independently to place the housing at a level resting angle should the surface on which the device 100 is resting not be level. The user interface 116 may also be coupled to the housing in a pivoting arrangement such that the user-interface may be rotated up or down to improve a user's viewing angle.

The function buttons 126 may be hard-coded to a single mode of operation to other function, or may be adaptable as touch-sensitive buttons included in the display. According to an aspect of the present disclosure, the function buttons 126 may include a button for a zero function mode, in which the scale may be zeroed and a mode button for setting a dispensing mode or other mode of operation as described herein. The function buttons 126 may also include a powder function button configured to select one of several different types of powder, i.e., flake, ball, extruded, medium extruded, large extruded, or the like. A trickle function button may be configured to activate manually the rotation of the second barrel at a slow speed allowing a small amount of powder to be dispensed.

The housing 102 may further include a second portion 108, the surface of which may include a scale plate 110 included in, and operatively coupled to a high-accuracy scale mechanism disposed within the housing 102. The second portion 108 may further include a leveling device 111. The leveling device 111 may include a volume partially filled with a liquid and an air bubble. The leveling device 111 may be configured such that when the housing 102 is level on a surface, the air bubble comes to rest at the center of a window of the leveling device, as viewed by the user. The leveling legs 128 may be used to adjust the height of one or more portions of the housing 102 to place the scale in a level space, thus increasing the accuracy of the scale. While a bubble level is described herein, one of skill in the art will recognize that other leveling functions may be implemented, including a laser level, without deviating from the scope of the disclosure. The second portion 108 internally may include, scale circuitry and mechanics in connection with the scale plate 110 to provide a highly accurate weight of a volume of dispensed powder, as described herein. The scale circuitry and mechanics are further electronically coupled to the user interface 116 to receive and transmit operational settings and information, described herein.

Figure 2:
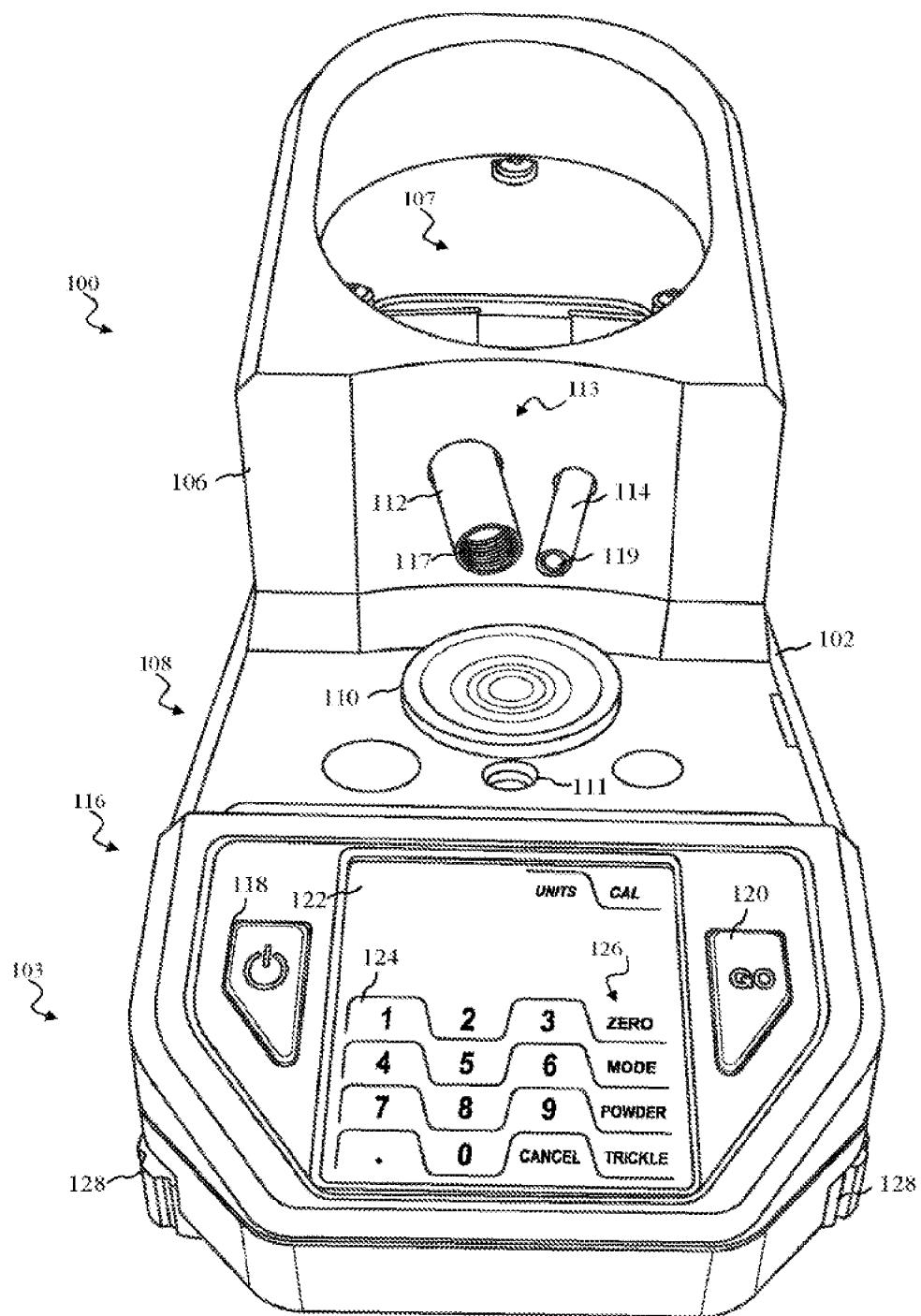
FIG. 2 depicts a front view of a powder dispenser device with the hopper removed according to one aspect of the present disclosure.

A third portion 106 of the housing 102 may include the hopper 104 and the cover 105 sized and shaped to retain a volume of powder when inserted in to a reservoir 107 defined by the housing 102. The hopper 104 may be a transparent material, such as a plastic, or other polymer-based substance that allows a user to view the current volume of powder resident in the hopper 104 and reservoir 107. The hopper 104 may be sized and shaped to be just smaller than an internal circumference or perimeter of the reservoir such that the hopper 104 rests inside of the reservoir 107 via a friction fit, for easy removal and replacement. FIG. 2 depicts a device 100 with the hopper removed, according to one aspect of the disclosure. Alternatively, the hopper may be affixed to the housing in any number of known methods, including, screws, clamps, or the like. The cover 105 may be sized and shaped to provide a sealing, friction fit with the hopper 104 in order to minimize the amount of air flow into and out of the hopper. The cover may also be coupled to the hopper by other mechanisms known in the art.

Figure 7:
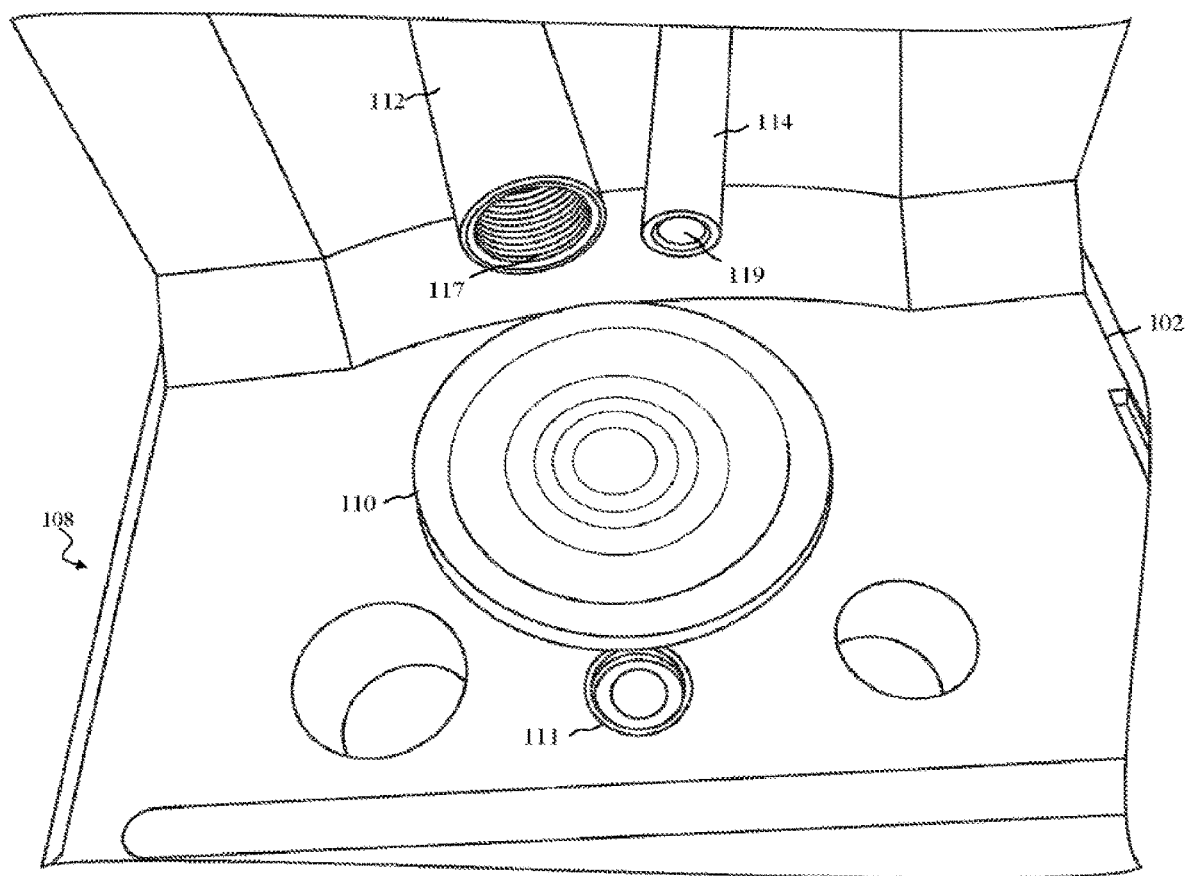
FIG. 7 depicts an expanded view of a scale portion of a powder dispenser device according to one aspect of the present disclosure.

The third portion 106 of the housing 102 may further include a dual-barrel arrangement 113 configured to dispense powder from the reservoir 107 and hopper 104 to a receptacle or tray disposed on the scale plate 110. FIG. 7 depicts an expanded view of the external portion of the dual-barrel arrangement 113. The dual-barrel arrangement 113 may include a first barrel 112 and a second barrel 114, each of which are in fluid communication with the reservoir 107 and extend out of the housing 102 above the second portion 108 and above the scale plate 110. The first barrel 112 and the second barrel 114 may be disposed at a downward angle from the reservoir toward the scale plate. The first barrel 112 may include a threaded interior surface 117 and be larger in diameter. First barrel 112 may be configured for a fast, larger volume dispensing operation. The second barrel 114 may include a substantially smooth interior surface 119 and may be smaller in diameter. The second barrel 114 may be configured for a finer, slower and more accurate dispensing operation.

Figure 3:
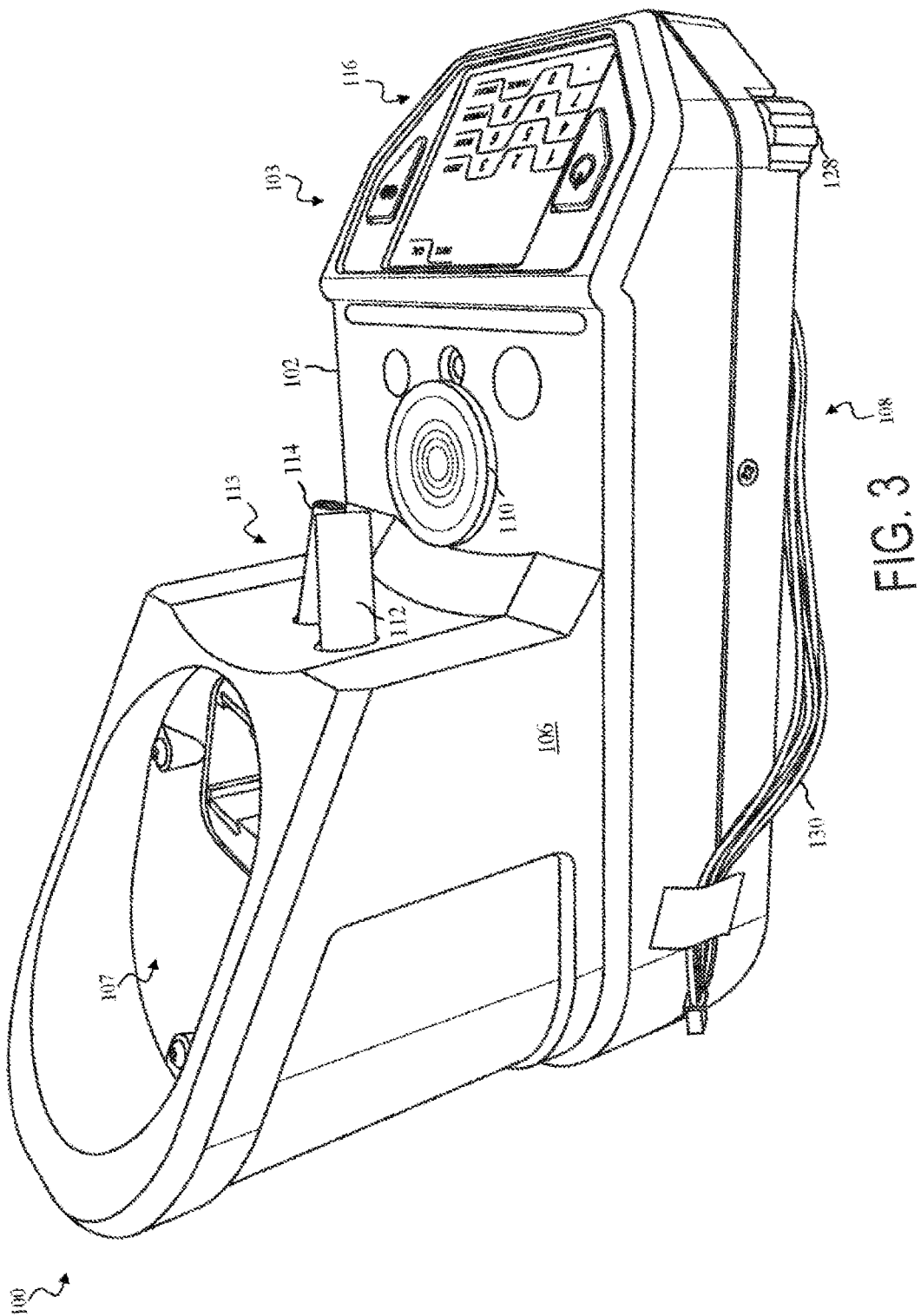
FIG. 3 depicts a first side view of a powder dispenser device according to one aspect of the present disclosure.

The electronics and mechanics of the device 100 may be coupled to a power source by a power supply line 130, as depicted in FIG. 3. The power supply line 130 may be configured to receive power from a source including an alternating current (AC) source, a direct current (DC) source, or the like. When the power supply line 130 is connected to a power source, the operation of the device 100 may be initiated by activating the power button 118.

Figure 4A:
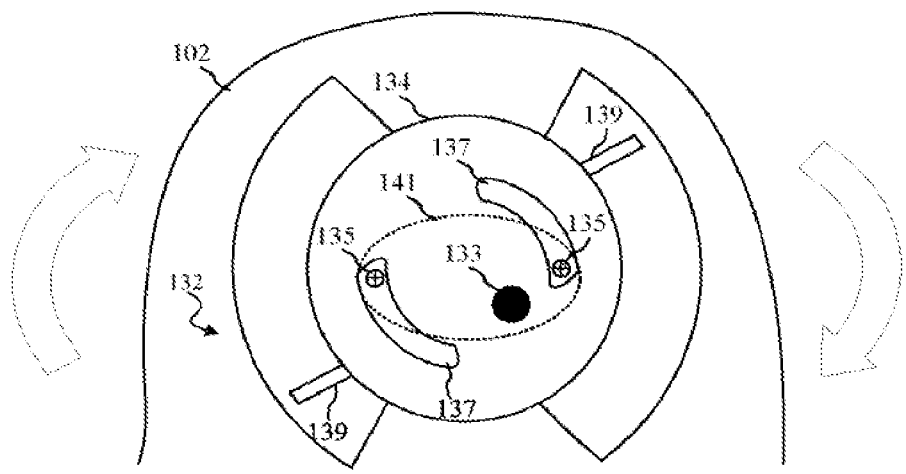
FIG. 4A depicts a drain assembly in a first position according to one aspect of the present disclosure.
Figure 4B:
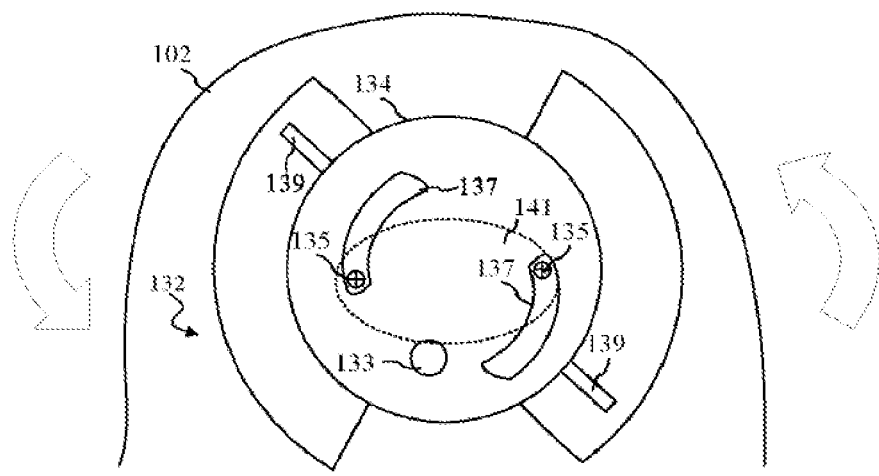
FIG. 4B depicts a drain assembly in a second position according to one aspect of the present disclosure.

The third portion 106 of the housing 102 may further include a drain assembly 132 to provide a drain path for the emptying of the hopper 104 and reservoir 107. FIGS. 4A-4B depict the underside of the housing 102 in which the drain assembly 132 may be disposed. According to one aspect, the drain assembly 132 may include a drain hole 133 defined in a drain disk 134. The drain disk 134 may further include or define one or more rotational guides 137. The rotational guides 137 may be apertures or recesses in the drain disk 134 that are configured to guide the rotation of the drain disk 134 about one or more fixed posts 135. The fixed posts 135 may be, according to one aspect, screws, nails, pegs, or the like. The drain disk 134 may also include one or more flanges 139 extending from drain disk. A fixed plate 141 may be disposed inside the housing 102 adjacent the drain disk 134, through which the fixed posts 135 may extend. According to one aspect, the fixed plate 141 and the drain disk 134 may be secured to the housing 102 by fixed posts 135, in the form of one or more screws.

Figure 5:
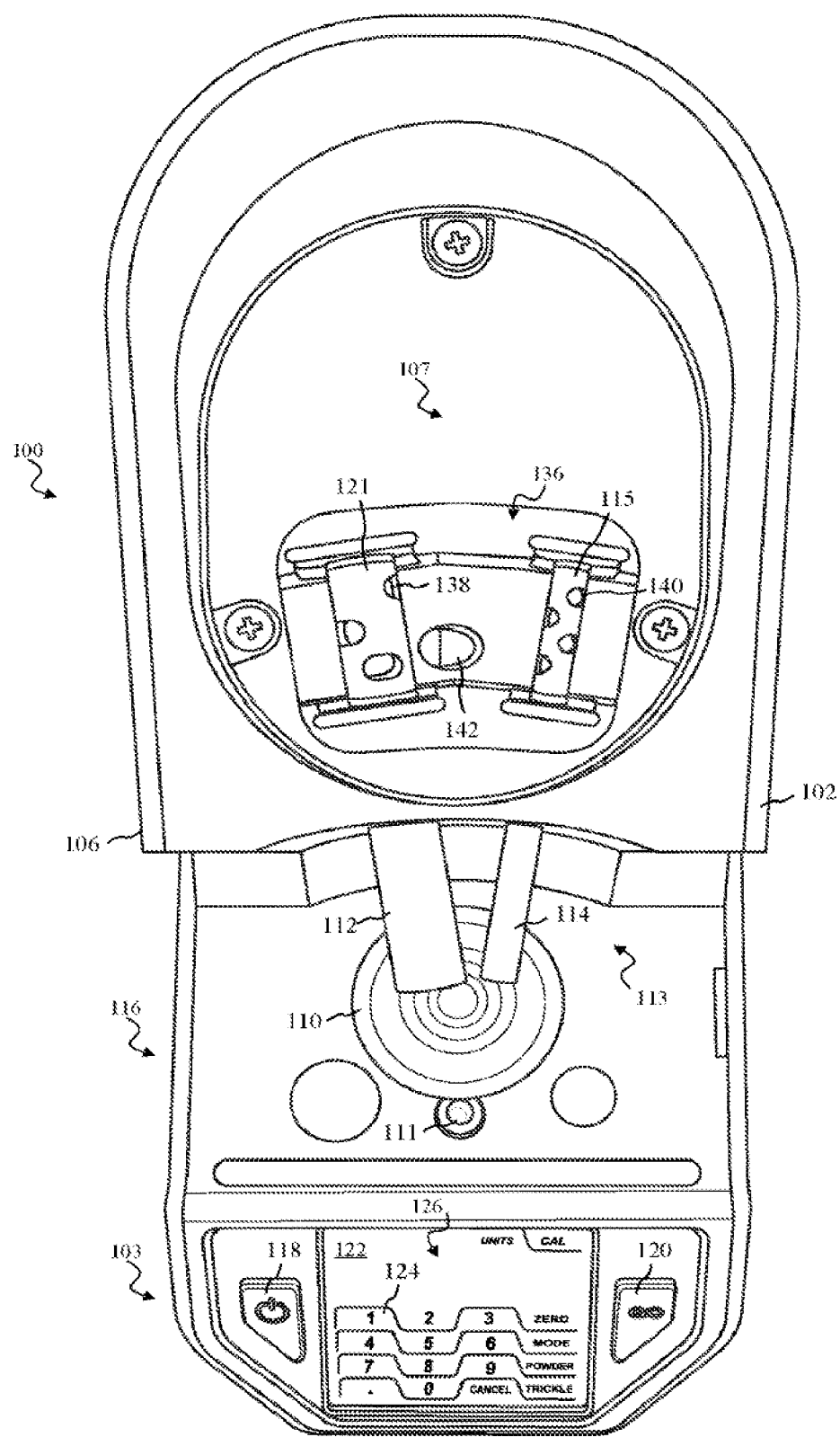
FIG. 5 depicts a top view of a powder dispenser device according to one aspect of the present disclosure.

In operation, according to one aspect of the disclosure, the reservoir 107 may be drained using the drain assembly 132. The housing 102 may be moved or placed such that the third portion 106 overhangs the edge of the surface on which the device 100 rests to expose the underside of the housing 102 and the drain assembly 132. The drain assembly as depicted in FIG. 4A shows the drain assembly 132 in a closed position. The drain hole 133 is blocked by the fixed plate 141, thus preventing the flow of powder from the reservoir 107. To drain the reservoir 107, the user may rotate the drain disk 134 by grasping and rotating the one or more flanges 139 in a clockwise direction. As the rotational guides 137 of the drain disk 134 rotate about the fixed posts 135, the drain hole 133 may rotate past the fixed plate 141 to establish an open path to the reservoir 107, shown in FIG. 4B. With an open path established, the powder in the reservoir 107 may flow from the device 100 and into a receptacle placed or held below the drain assembly 132. As shown in FIG. 5, a reservoir drain 142 may be defined within the reservoir 107, at the reservoir's lowest point, to establish the fluid path to the drain assembly 132. To close the drain assembly 132, the user may rotate the drain disk 134 in a counter clockwise direction such that the drain hole 133 is blocked by the fixed plate 141.

According to one aspect of the disclosure, the drain assembly may include a sensor coupled to the processor, as described herein, and configured to transmit the position or state of the drain assembly. For example, upon rotation of the drain disk 134, the sensor may be triggered to indicate an open state that may in turn be reported or otherwise indicated on the user interface. An audible signal may also be generated to indicate an open drain condition. When the drain disk is rotated back to a close position, the sensor may transmit a signal to the processor and user interface indicating the closed state of the drain.

Figure 6:
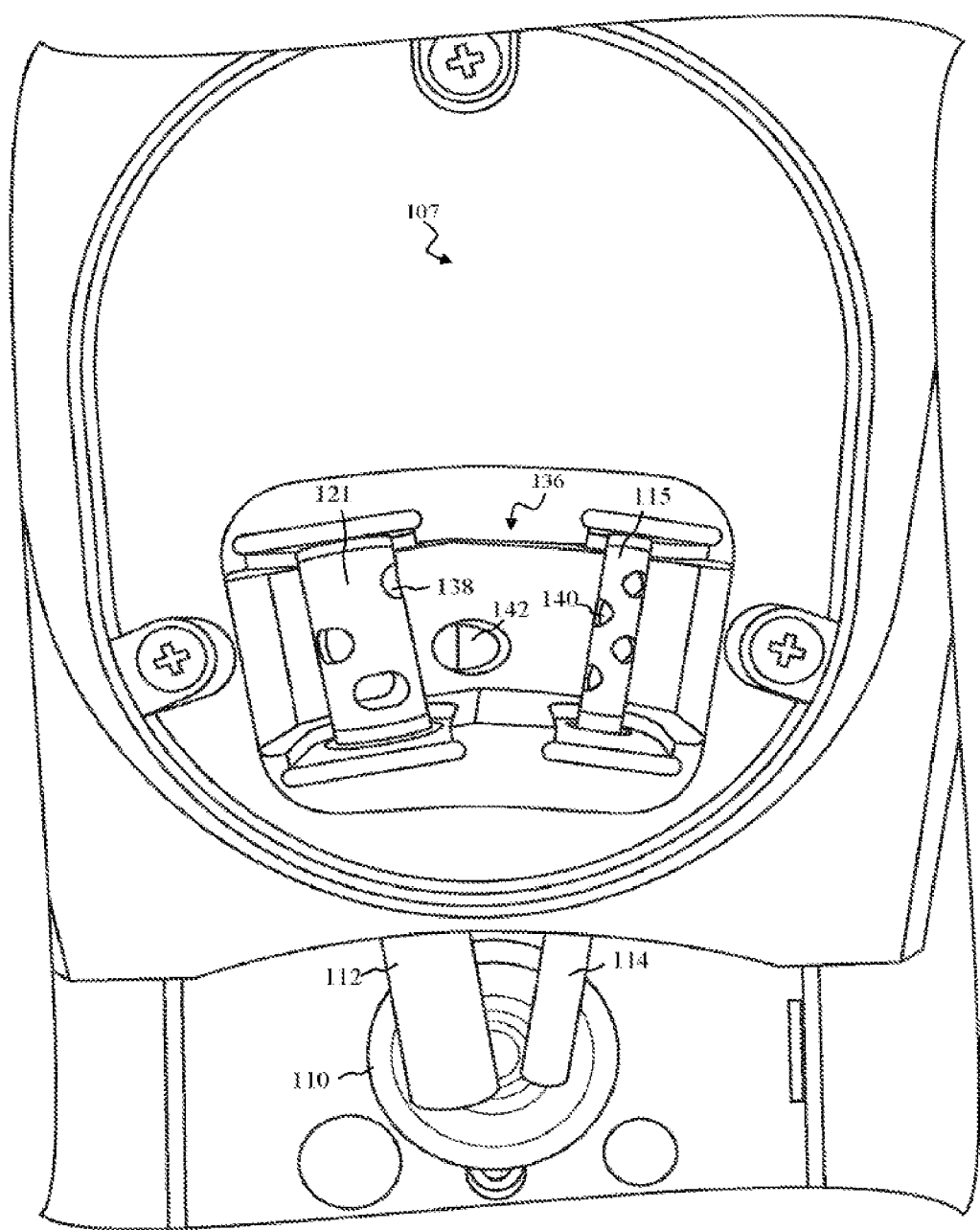
FIG. 6 depicts an expanded top view of a powder dispenser device according to one aspect of the present disclosure.

FIG. 6 depicts an expanded view of the reservoir 107 and dual-barrel arrangement 113. The reservoir 107 of the housing 102 may define a funnel area 136 into which powder retained in the reservoir 107 and hopper may flow. The dual-barrel arrangement 113 may include the first barrel 112 having an internal portion 121 extending into the funnel area 136 of the reservoir 107. The internal portion 121 of the first barrel 112 may include or define one or more apertures 138 through which powder may flow. The second barrel 114 may include an internal portion 115 may include or define one or more apertures 140 through which powder may flow.

Figure 8:
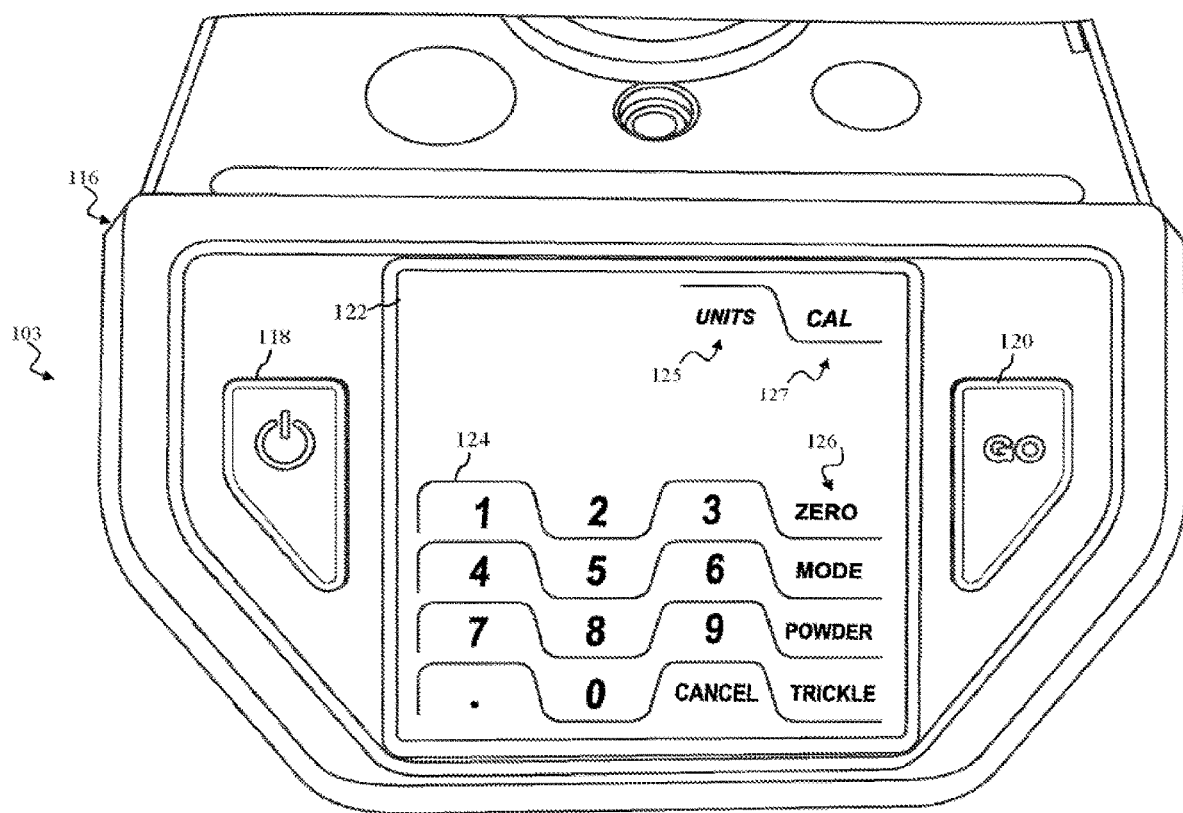
FIG. 8 depicts an expanded view of a user-interface of a powder dispenser device according to one aspect of the present disclosure.

FIG. 8 depicts an expanded view of the user-interface 116 according to one aspect of the disclosure. The display 122 may include a read-out area 123, and a "Units" button 125 to set or switch units (for example from g to gr, gr to g, of the like). A calibration button 127 may be included to allow the user to calibrate and re-calibrate the scale and device. Entering calibration mode may include placing an object of known weight on the scale plate 110 and adjust the scale via the user interface 116 to match the known weight. The user interface 116 may further include a keypad 124 and one or more function buttons 126. The power button 118 and the "Go" button 129 may be hard-coded and raised buttons while the keypad 124, function buttons 126 the unit button 125 and the calibration button 127 may be integrated into the display 122 as touch-sensitive pads. Alternative configurations, however, may be implemented including varying combinations of hard-coded and touch-sensitive buttons.

Figure 9:
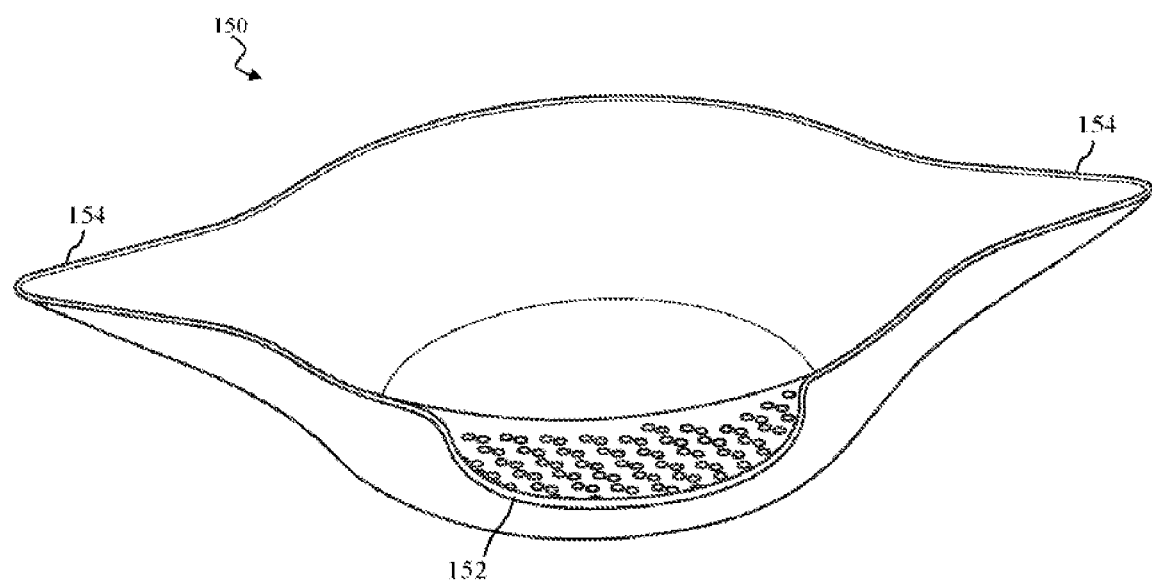
FIG. 9 depicts a perspective view of a powder tray according to one aspect of the present disclosure.

FIG. 9 depicts a powder receptacle 150 according to one aspect of the disclosure. The powder receptacle 150 may be formed from a lightweight metal, or other material and include a handle portion 152 and one or more spout portions 154. The handle portion 152 may include a raised pattern or grip to facilitate handling of the receptacle and the powder dispensed into it. The spout portions 154 may be size and shaped to facilitate the flow of powder out of the receptacle 150 and into a casing with minimal or no spillage. The receptacle 150 as described herein is exemplary and the shape and material of the receptacle may vary without deviating from the scope of the disclosure.

In operation, the device 100 may dispense a highly-accurate weight of powder through the dual-barrel arrangement 113. The hopper 104 and reservoir 107 may be filled with the desired powder and the cover 105 place to seal the reservoir 107 from outside contamination. With the reservoir filled, the user may power-on the device using the power button 118 on the user interface 116. A user may opt to zero the scale before beginning a dispensing operation. Zeroing the scale may include placing the receptacle on the scale plate 110 and pressing a "Zero" button, among the function buttons 126. The scale will be set to a zero weight, accounting for the weight of the receptacle, such that the weight registered by the scale represents the weight of the powder alone, and not the powder and receptacle together.

Further using the user interface 116, the user may input the desired mode, and other settings, as described herein, and press the "Go" button 120. The device, based on the input parameters will begin to dispense the powder from the reservoir 107 through the dual-barrel arrangement 113. One or more motors may be disposed within the housing and coupled to the first barrel 112 and the second barrel 114. The motors may drive rotation of the barrels such that powder from the reservoir 107 may flow into the internal portion 121 of the first barrel 112 through the apertures 138 and the internal portion 115 of the second barrel 114 through the apertures 140. The rotation of the barrels may create a flow of powder from the reservoir, through the barrels and into the receptacle resting on the scale plate. The speed at which the barrels rotate may dictate the rate at which the powder flows from the reservoir into the barrels and out to the receptacle. The first barrel 112, for example, may be larger in internal diameter than the second barrel 114 and have larger apertures 138 to receive the powder. The first barrel 112 may be used for dispensing a bulk amount of the total weight due to its increased capacity and rotational speed. The second barrel 114, having a smaller internal diameter and smaller apertures 140, may be used to dispense a smaller amount of powder to complement the weight dispensed from the first barrel 112, bringing the total weight of the dispensed powder to the desired weight.

For example, the device may be calibrated to dispense and weigh powder to an accuracy of 0.0001 gram. If the user desired to dispense 2 grams of powder to fill a casing, the user may input such a limit or setting into the interface, or select a pre-defined mode, prior to initiating a dispensing operation. The device 100 may begin to dispense the powder through the first barrel 112, as rotated by the motor. As the powder is dispensed into a receptacle deposited on the scale plate 110, the scale may continuously monitor the weight of the dispensed powder until it approaches 2 grams. As the weight approaches its final amount, within a certain percentage, for example, the second barrel 114 may begin to rotate and dispense the powder at a more deliberate and accurate rate. The use of the fine motor dispensing with the second barrel 114 allows the device to dispense the final amount of powder bringing the total weight to 2 grams, within 0.001 grams.

According to one aspect the two barrels may dispense powder simultaneously until the target weight is approached. At such a time, the device may stop the rotation of the first barrel 112 and rely solely on the second barrel 114 to finish dispensing. Alternatively, the barrels may operate in sequence where the first barrel 112 is relied upon for dispensing until the target weight is approached, at which time the first barrel 112 stops and the second barrel 114 begins to rotate and dispense the final amount.

According to one aspect, the user interface may be used to pre-program the device for a dispensing operation. A pre-set weight may be entered, via the user interface, and upon the user pressing the "Go" button 120, the device will control the dual-barrel arrangement 113 to dispense the pre-set weight. Alternatively, the user may manually control the dispensing of powder using the function buttons to switch between the first barrel 112 and the second barrel 114 as the displayed weight approaches the target weight.

According to one aspect, the device 100 may be configured to dispense manually powder charge-by-charge. A user may configure the device for a manual dispensing operation and set a charge weight through the user interface. Activating the "Go" button 120 may then dispense the powder until the target weight is sensed by the scale. Alternatively, according to one aspect, an automatic mode may be implemented in which the device will automatically dispense a pre-set charge upon sensing an empty powder receptacle 150. In such a mode, the user enter the charge weight into the user interface 116 and press the "Go" button 120. When the powder receptacle 150 is placed on the scale plate 110, and the device 100 determines the powder receptacle 150 is empty, the device 100 will automatically dispense the appropriate charge. The automatic mode may allow a user to fill rapidly a number of charges by placing an empty powder receptacle 150 on the scale plate 110 without having to repeat the manual programming steps.

According to one aspect, the device may be configured to operate in differing units, including grams (g), grains (gr), and other known units of measure. The user interface 116 may include a "Units" function button 125 or other button to set or switch the units weighed and shown to the user. The device may also be configured to operate in a number of modes, including a standard mode in which the device and scale is configured to provide a 0.1 gr (0.01 g) accuracy for a charge of 3 to 1000 gr. A second mode may include a match mode in which different grain weight ranges feature different accuracy tolerances. For example, a first interval match mode may be defined for dispensing 3-300 gr. The accuracy for such a dispensing operation may be 0.04 gr (0.004 g). A second interval between 300 and 1000 gr may have an accuracy of 0.1 gr. In a match mode, a higher degree of accuracy may be obtained (i.e., a 42.5 gr target may now be measured to 42.53). One of skill in the art will recognize that the level of accuracy and dispensing ranges, according to one aspect, may be scaled or otherwise adapted based on the mechanics and electronics of the device, without deviating from the scope of the present disclosure.

The device may include a number of powder configuration settings to achieve further accuracy and speed in dispensing operations. According to one aspect of the disclosure, the device 100 may be pre-programmed with a number of powder configurations. Additionally, the device 100 may allow for a number of user-programmable settings that may be entered, saved and recalled by the user through the user interface, described herein.

Figure 10:
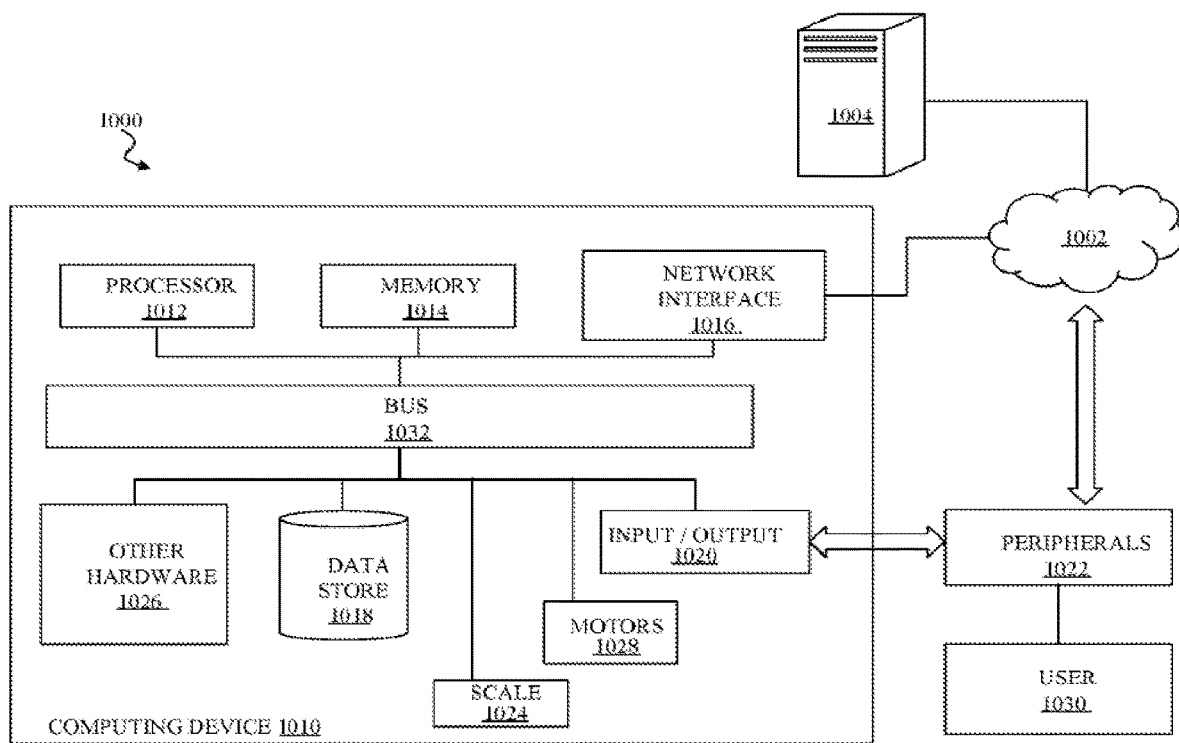
FIG. 10 depicts a hardware architecture of a powder dispenser device according to an aspect of the present disclosure.

The device 100 may include a computing system 1000, as depicted in FIG. 10, to receive inputs and drive the operation of the device 100. In general, the computing system 1000 may include a computing device 1010, such as a special-purpose computer designed and implemented for directing and controlling the operation and provision of powder. The computing device 1010 may be or include data sources, client devices, and so forth. For example, the computing device 1010 may include a microprocessor installed and disposed within a device. In certain aspects, the computing device 1010 may be implemented using hardware or a combination of software and hardware.

The computing device 1010 may communicate across a network 1002. The network 1002 may include any data network(s) or internetwork(s) suitable for communicating data and control information among participants in the computing system 1000. This may include public networks such as the Internet, private networks, and telecommunications networks such as the Public Switched Telephone Network or cellular networks using cellular technology and/or other technologies, as well as any of a variety other local area networks or enterprise networks, along with any switches, routers, hubs, gateways, and the like that might be used to carry data among participants in the computing system 1000. The network 1002 may also include a combination of data networks and need not be limited to a strictly public or private network.

The computing device 1010 may communicate with an external device 1004. The external device 1004 may be any computer or other remote resource that connects to the computing device 1010 through the network 1002.

In general, the computing device 1010 may include a processor 1012, a memory 1014, a network interface 1016, a data store 1018, and one or more input/output interfaces 1020. The computing device 1010 may further include or be in communication with peripherals 1022 and other external input/output devices that might connect to the input/output interfaces 1020.

The processor 1012 may be any processor or other processing circuitry capable of processing instructions for execution within the computing device 1010 or computing system 1000. The processor 1012 may include a single-threaded processor, a multi-threaded processor, a multi-core processor and so forth. The processor 1012 may be capable of processing instructions stored in the memory 1014 or the data store 1018.

The memory 1014 may store information within the computing device 1010. The memory 1014 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 1014 may store program instructions, program data, executables, and other software and data useful for controlling operation of the computing device 1010 and configuring the computing device 1010 to perform functions for a user.

The memory 1014 may include a number of different stages and types of memory for different aspects of operation of the computing device 1010. For example, a processor may include on-board memory and/or cache for faster access to certain data or instructions, and a separate, main memory or the like may be included to expand memory capacity as desired. All such memory types may be a part of the memory 1014 as contemplated herein.

The memory 1014 may, in general, include a non-volatile computer readable medium containing computer code that, when executed by the computing device 1010 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein. While a single memory 1014 is depicted, it will be understood that any number of memories may be usefully incorporated into the computing device 1010.

The network interface 1016 may include any hardware and/or software for connecting the computing device 1010 in a communicating relationship with other resources through the network 1002. This may include remote resources accessible through the Internet, as well as local resources available using short range communications protocols using, e.g., physical connections (e.g., Ethernet), radio frequency communications (e.g., Wi-Fi, Bluetooth), optical communications, (e.g., fiber optics, infrared, or the like), ultrasonic communications, or any combination of these or other media that might be used to carry data between the computing device 1010 and other devices. The network interface 1016 may, for example, include a router, a modem, a network card, an infrared transceiver, a radio frequency (RF) transceiver, a near field communications interface, a radio-frequency identification (RFID) tag reader, or any other data reading or writing resource or the like.

The network interface 1016 may include any combination of hardware and software suitable for coupling the components of the computing device 1010 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 1002 such as the Internet. This may also include hardware/software for a WiMax connection or a cellular network connection (using, e.g., CDMA, GSM, LTE, or any other suitable protocol or combination of protocols). The network interface 1016 may be included as part of the input/output devices 820 or vice-versa.

The data store 1018 may be any internal memory store providing a computer-readable medium such as a disk drive, an optical drive, a magnetic drive, a flash drive, or other device capable of providing mass storage for the computing device 1010. The data store 1018 may store computer readable instructions, data structures, program modules, and other data for the computing device 1010 or computing system 1000 in a non-volatile form for relatively long-term, persistent storage and subsequent retrieval and use. For example, the data store 818 may store an operating system, application programs, program data, databases, files, and other program modules or other software objects and the like.

The input/output interface 1020 may support input from and output to other devices that might couple to the computing device 1010. This may, for example, include the user interface, serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also include an infrared interface, RF interface, magnetic card reader, or other input/output system for wirelessly coupling in a communicating relationship with other local devices. It will be understood that, while the network interface 1016 for network communications is described separately from the input/output interface 1020 for local device communications, these two interfaces may be the same, or may share functionality, such as where a USB port is used to attach to a Wi-Fi accessory, or where an Ethernet connection is used to couple to a local network attached storage.

The computing device may include or communicate with motors 1028 to drive the physical operation of the dual-barrel assembly. The motors 1028 may be driven by the processor 1012 according to parameters and inputs from the user, user interface and input/output 1020. The motors may also operate in conjunction with the scale 1024, which may be driven by the processor to measure and record weight measurements from the scale plate 110 during a dispensing operation. The scale 1024 may include an electromagnetic type or load cell type scale.

A peripheral 1022 may include any device used to provide information to or receive information from the computing device 1010. This may include human input/output (I/O) devices such as a keyboard, a mouse, a mouse pad, a track ball, a joystick, a microphone, a foot pedal, a camera, a touch screen, a scanner, mobile device or other device that might be employed by the user 1030 to provide input to the computing device 1010 via the user interface. This may also or instead include a display, a printer, a projector, a headset or any other audiovisual device for presenting information to a user. The peripheral 1022 may also or instead include a digital signal processing device, an actuator, or other device to support control of or communication with other devices or components. In one aspect, the peripheral 1022 may serve as the network interface 1016, such as with a USB device configured to provide communications via short range (e.g., Bluetooth, Wi-Fi, Infrared, RF, or the like) or long range (e.g., cellular data or WiMax) communications protocols. In another aspect, the peripheral 1022 may augment operation of the computing device 1010 with additional functions or features, such as a global positioning system (GPS) device, or other device. In another aspect, the peripheral 1022 may include a storage device such as a flash card, USB drive, or other solid-state device, or an optical drive, a magnetic drive, a disk drive, or other device or combination of devices suitable for bulk storage. More generally, any device or combination of devices suitable for use with the computing system 1000 may be used as a peripheral 1022 as contemplated herein.

Other hardware 1026 may be incorporated into the computing system 1000 such as a co-processor, a digital signal processing system, a math co-processor, a graphics engine, a video driver, a camera, a microphone, speakers, and so forth. The other hardware 1026 may also or instead include expanded input/output ports, extra memory, additional drives, and so forth.

A bus 1032 or combination of busses may serve as an electromechanical backbone for interconnecting components of the computing device 1010 such as the processor 1012, memory 1014, network interface 1016, other hardware 1026, data store 1018 input/output interface 1020, and motors 1028. As shown in the figure, each of the components of the computing device 1010 may be interconnected using a system bus 1032 in a communicating relationship for sharing controls, commands, data, power, and so forth.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A powder dispensing device comprising:
   a housing;
   a hopper sized and shaped to engage the housing to form a reservoir;
   a first barrel having one or more first apertures and a first internal diameter, the first barrel in fluid communication with the reservoir via the one or more first apertures;
   a second barrel having one or more second apertures and a second internal diameter, the second barrel in fluid communication with the reservoir via the one or more second apertures, wherein the first internal diameter is greater than the second internal diameter;
   at least one motor coupled to the first barrel and the second barrel, the at least one motor configured to rotate the first barrel and the second barrel;
   a scale electrically coupled to a scale plate, the scale plate disposed on the housing and below the first barrel and the second barrel;
   a user interface in electrical communication with the at least one motor and the scale, the user interface configured to receive a user-input of a target weight; and
   a controller electrically coupled to the at least one motor, scale and user interface, the controller configured to: operate the at least one motor according to the user input receive a measurement from the scale; and adjust the operation of the at least one motor according to the measurement from the scale, such that controller operates the first barrel to dispense powder until a first portion of the target weight is measured by the scale, and subsequently stop rotation of the first barrel and begin operating the second barrel until the target weight is measured by the scale.

2. The powder dispensing device of claim 1, wherein the one or more first apertures are larger than the one or more second apertures.

3. The powder dispensing device of claim 1, further comprising comprising a drain assembly, the drain assembly comprising: a rotatable drain disk coupled to the housing and defining a drain hole, the drain disk rotatable between a first position wherein the drain hole is blocked from the reservoir and a second position wherein the drain hole is in communication with the reservoir.

4. The powder dispensing device of claim 3, further comprising a fixed plate disposed between the reservoir and the drain disk, the fixed plate blocking the drain hole when the drain disk is rotated to the first position, the drain hole in fluid communication with the reservoir when the drain disk is rotated to the second position.

5. The powder dispensing device of claim 3, further comprising a sensor transmitting a signal representative of a position of the drain disk.

6. The powder dispensing device of claim 5, wherein the signal representative of the position of the drain disk is an audible signal.

7. The powder dispensing device of claim 1 wherein the at least one motor comprises a first motor configured to drive the first barrel and a second motor configured to drive the second barrel.

8. The powder dispensing device of claim 1 wherein the first barrel and the second barrel are disposed at a downward angle from the reservoir toward the scale plate.

9. A powder dispensing device comprising:
   a housing;
   a hopper sized and shaped to engage the housing to form a reservoir;
   a first barrel having one or more first apertures and a first internal diameter, the first barrel in fluid communication with the reservoir via the one or more first apertures;
   a second barrel having one or more second apertures and a second internal diameter, the second barrel in fluid communication with the reservoir via the one or more second apertures, wherein the first internal diameter is greater than the second internal diameter;

at least one motor coupled to the first barrel and the second barrel, the at least one motor configured to rotate the first barrel and the second barrel;

a scale electrically coupled to a scale plate, the scale plate disposed on the housing and below the first barrel and the second barrel;

a drain assembly, the drain assembly comprising: a rotatable drain disk coupled to the housing and defining a drain hole, the drain disk rotatable between a first position wherein the drain hole is blocked from the reservoir and a second position wherein the drain hole is in communication with the reservoir;

a sensor transmitting a signal representative of a position of the drain disk; and a user interface in electrical communication with the at least one motor and the scale, the user interface configured to receive a user-input.

10. The powder dispensing device of claim 9 wherein the user input comprises a target weight, the at least one motor rotating the first barrel until the target weight is measured by the scale.

11. The powder dispensing device of claim 9 wherein the user input comprises a target weight, wherein the at least one motor rotates the first barrel until a first portion of the target weight is measured by the scale and the at least one motor rotates the second barrel until a second portion of the target weight is measured by the scale.

12. The powder dispensing device of claim 11 wherein the at least one motor rotates the first barrel at a first speed and rotates the second barrel at a second speed.

13. The powder dispensing device of claim 12 wherein the first speed is faster than the second speed.

14. A powder dispensing device comprising:

a housing;

a hopper sized and shaped to engage the housing to form a reservoir;

a first barrel having one or more first apertures and a first internal diameter, the first barrel in fluid communication with the reservoir via the one or more first apertures;

a second barrel having one or more second apertures and a second internal diameter, the second barrel in fluid communication with the reservoir via the one or more second apertures, wherein the first internal diameter is greater than the second internal diameter;

at least one motor coupled to the first barrel and the second barrel, the at least one motor configured to rotate the first barrel and the second barrel;

a scale electrically coupled to a scale plate, the scale plate disposed on the housing and below the first barrel and the second barrel;

a user interface in electrical communication with the at least one motor and the scale, the user interface configured to receive a user-input of a target weight; and a controller electrically coupled to the at least one motor, scale and user interface, the controller configured to: select an accuracy tolerance based on the target weight, operate the at least one motor according to the target weight at the accuracy tolerance.

15. The powder dispensing device of claim 14 wherein the user input comprises a target weight, wherein the at least one motor rotates the first barrel until a first portion of the target weight is measured by the scale and the at least one motor rotates the second barrel until a second portion of the target weight is measured by the scale.

16. The powder dispensing device of claim 14 wherein the at least one motor rotates the first barrel at a first speed and rotates the second barrel at a second speed.

17. The powder dispensing device of claim 16 wherein the first speed is faster than the second speed.

18. The powder dispensing device of claim 14, further comprising a drain assembly, the drain assembly comprising: a rotatable drain disk coupled to the housing and defining a drain hole, the drain disk rotatable between a first position wherein the drain hole is blocked from the reservoir and a second position wherein the drain hole is in communication with the reservoir.

19. The powder dispensing device of claim 18, further comprising a sensor transmitting a signal representative of a position of the drain disk.

* * * * *